United States Patent [19]

Kunold, Jr.

[11] Patent Number: 4,559,662
[45] Date of Patent: Dec. 24, 1985

[54] DEVICE FOR CLEANING CONTACT LENS

[76] Inventor: Robert Kunold, Jr., 3394 Point White Dr., Bainbridge Island, Wash. 98110

[21] Appl. No.: 610,098

[22] Filed: May 14, 1984

[51] Int. Cl.⁴ .............................................. G02C 13/00
[52] U.S. Cl. ................... 15/104.94; 15/97 R; 15/104.92; 15/214; 401/10
[58] Field of Search ............. 15/97 R, 104.92, 104.94, 15/214, 21 A, 160, 210, 118, 97, 21; 401/9, 10, 11

[56]  References Cited
U.S. PATENT DOCUMENTS

| 654,486 | 7/1900 | Pederson. | |
|---|---|---|---|
| 1,003,761 | 9/1911 | Lehmann. | |
| 1,845,315 | 2/1932 | Meikle. | |
| 3,006,009 | 10/1961 | Hoffecker | 15/21 A |
| 3,044,089 | 7/1962 | Boynton | 15/21 A |
| 3,056,998 | 10/1962 | Ebner. | |
| 3,135,987 | 6/1964 | Huch. | |
| 3,344,461 | 10/1967 | Floor | 15/118 |
| 3,378,873 | 4/1968 | Strout. | |
| 3,564,636 | 2/1971 | Tomer. | |
| 3,623,492 | 11/1971 | Frantz et al.. | |
| 4,187,574 | 2/1980 | Wrue. | |

FOREIGN PATENT DOCUMENTS 381301  10/1932  United Kingdom ............... 15/21 A Primary Examiner—Edward L. Roberts
Attorney, Agent, or Firm—Christopher Duffy

[57]  ABSTRACT

A contact lens is trapped on an axis of revolution while one side of it and then the other is rotated against the opposing surface of a mating scrubber element normally treated with cleaning solution.

22 Claims, 8 Drawing Figures

U.S. Patent   Dec. 24, 1985   Sheet 2 of 2   4,559,662
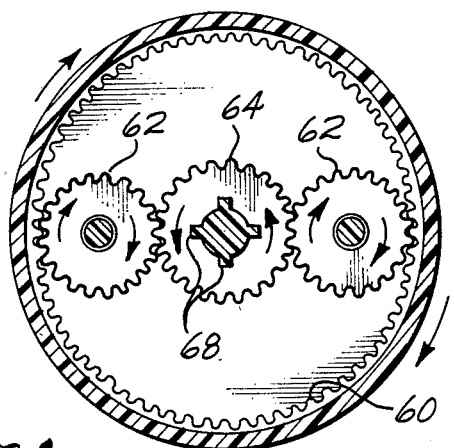
Fig. 4
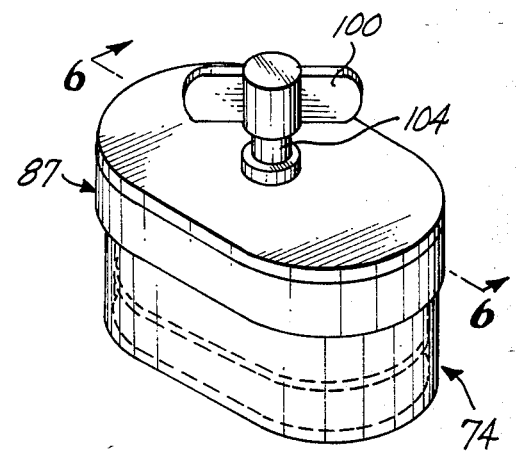
Fig. 5
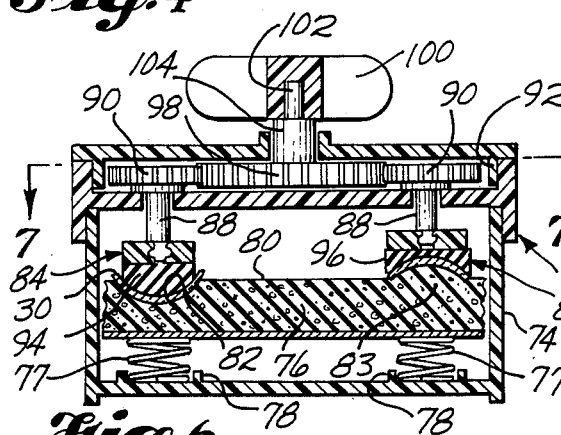
Fig. 6
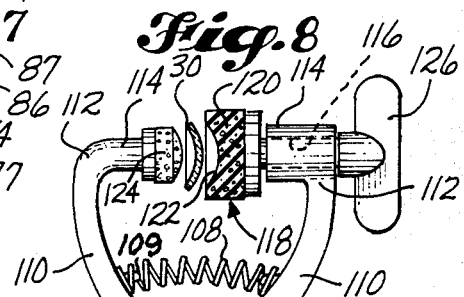
Fig. 8
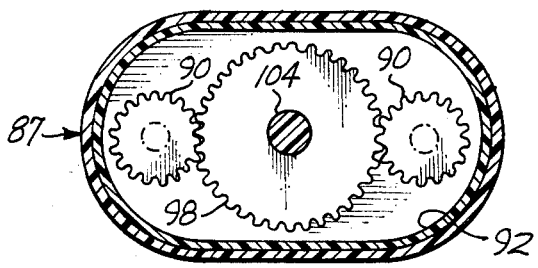
Fig. 7
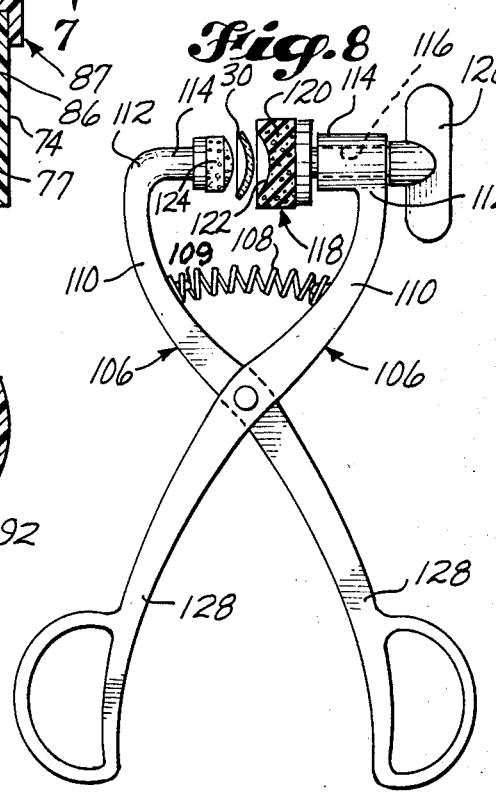

DEVICE FOR CLEANING CONTACT LENS

THE INVENTION IN GENERAL

This invention relates to a device for cleaning contact lens and particularly one which is equally effective with either hard or soft lens.

Users of contact lens must clean them periodically and preferably should do so when they are taken out and stored for later use. A hard lens has a certain amount of rigidity and can be cleaned on both sides by rubbing it between ones fingers while it is coated with a cleaning solution. However, a soft lens is far less rigid and cannot be rubbed between ones fingers without the risk of damaging it. Instead, it is best to clean one side at a time, perhaps by rubbing it against the palm of one hand with one finger of the other. Yet even this technique risks that the lens will be torn or slit by the user's fingernail.

In U.S. Pat. No. 4,187,574 a device is disclosed for cleaning a contact lens, but the device is designed to induce the lens to travel in an arc across the interface between two spongy surfaces, and of course, such an induced movement risks damaging the lens. Furthermore, such a movement is prohibitive in the case of a soft lens in that the lens tends to fold over on itself and roll up when it is subjected to radial or edgewise forces.

The device which is the subject of the present invention effectively traps the lens on an axis of revolution while one side of it and then the other is rotated against the opposing surface of a mating scrubber element normally treated with cleaning solution. The device comprises a pair of manually operated clamping means which open and close in relation to one another substantially along an axis extending therebetween. The clamping means have a pair of scrubber elements thereon that are cooperatively engagable with one another at the relatively forward ends thereof when the clamping means are closed. However, yieldable biasing means are operatively interposed between the clamping means so that when the clamping means are closed, the ends of the scrubber elements engage one another against the bias thereof. The scrubber elements have complementary convex and concave surfaces on the respective ends thereof, and the surfaces are adapted to mate with the opposing sides of a contact lens and clamp the lens lightly therebetween when the scrubber elements engage one another. Moreover, the ends of the elements are rotatable in relation to one another about the axis, and there are drive means on the clamping means whereby the ends of the elements can be rotated in relation to one another when the lens is clamped between the surfaces thereof. Meanwhile, the clamping means are so cooperatively interconnected with one another in the closed position thereof, that they resist rotation about the axis in relation to one another when the ends of the elements are rotated in relation to one another.

In practice the invention can take many forms. For example, in many of the presently preferred embodiments of the invention, one of the scrubber elements comprises a shaft which is rotatably mounted on one of the respective clamping means and has a scrubber head at the relatively forward end thereof. In certain embodiments, the shaft has a rotor connected therewith for rotating the scrubber head at the relatively forward end thereof; and in many embodiments, the rotor is connected with the relatively rearward end of the shaft on the opposite side of the body of the one clamping means from the relatively forward end of the shaft. In certain of these latter embodiments, moreover, the connection between the rotor and the shaft includes a gear train for changing the rotory speed of the shaft in relation to that imparted to the rotor.

Furthermore, in certain of the presently preferred embodiments of the invention, one of the scrubber elements comprises a coiled spring which is mounted on one of the respective clamping means and has a scrubber head at the relatively forward end thereof. For example, in some embodiments, one of the clamping means has a recess therein, and the corresponding scrubber element is cradled in the recess and includes a coiled spring which is interposed between the relatively forward end of the respective scrubber element and the bottom of the recess.

Preferably, the connection between the respective clamping means includes a limit stop for the closed position thereof, and closing the clamping means to the stop operates to clamp the lens lightly between the surfaces of the elements under a predetermined bias therebetween. Alternatively, the yieldable biasing means may limit the travel of the clamping means to a closed position at which the user can sense that the lens is lightly clamped between the surfaces of the elements under a predetermined bias therebetween.

In some of the presently preferred embodiments of the invention, the ends of the scrubber elements are pestle and mortar-like, respectively, and have opposing surfaces thereon which are guided into engagement with one another when the clamping means are closed. In some of these, the surface of the pestle-like end is convex, and the surface of the mortar-like end has a concave recess therein which is adapted to mate with the surface of the pestle-like end and vice versa. In other embodiments, the surface of the mortar-like end has a convex dome thereon, and the surface of the pestle-like end has a concave recess therein which is adapted to mate with the dome of the mortar-like end and and vice versa.

In certain particularly useful embodiments, one scrubber element has a rigidly backed, convexly shaped, pestle-like sponge nipple at the forward end thereof, and the other scrubber element has a rigidly backed, concavely recessed, mortar-like sponge pad at the forward end thereof. Sometimes, the sponges have different coefficients of friction at the respective convex and concave surfaces thereof, to aid in the scrubbing action. In some embodiments, the sponges are mounted in the recesses of a pair of cups which telecopically interconnect with one another at the open ends thereof. In certain embodiments, the sponge pad has a coiled spring assembled therewith and the assembly is mounted in the recess of the corresponding cup. Moreover, the sponge nipple is rotatably mounted in the recess of the other cup, and there is a hand operated rotor connected with the nipple outside of the latter cup to rotate the sponges in relation to one another when the cups are interconnected at the open ends thereof.

In other embodiments, the sponges are mounted on corresponding end portions of a pair of tongs which are pivotally interconnected with one another. The yieldable biasing means comprise a coiled spring which is interposed between the aforesaid end portion of the tongs to limit the travel of the same to a closed position at which the user can sense that the lens is lightly clamped between the surfaces of the sponges under a predetermined bias therebetween.

In a particularly useful group of embodiments, there are pairs of scrubber elements on the clamping means, the relatively forward ends of which are cooperatively engageable with one another when the clamping means are closed. The ends have complementary convex and concave surfaces thereon that are reversedly disposed to one another, from one pair to the other, so that the respective pairs of surfaces will mate with a pair of lens that are reversedly disposed to one another.

In certain of the latter embodiments, one scrubber element in each pair has a rigidly backed, convexly shaped, pestle-like sponge at the relatively forward end thereof, and the other scrubber element in the respective pair has a rigidly backed, concavely recessed, mortar-like sponge at the relatively forward end thereof. The respective pairs of sponges have differing coefficients of friction at the respective surfaces thereof, from one pair to the other, at least with respect to one of the sponges in each of the respective pairs.

BRIEF DESCRIPTION OF THE DRAWINGS

These features will be better understood by reference to the accompanying drawings wherein:

FIG. 4 is a cross-sectional view along the line 4—4 of FIG. 2;

FIG. 5 is a perspective view of a second embodiment;

FIG. 6 is a part cross-sectional view along the line 6—6 of FIG. 5;

FIG. 7 is a cross-sectional view along the line 7—7 of FIG. 6; and

FIG. 8 is a part cross-sectional elevational view of a third embodiment.

DESCRIPTION OF THE PREFERRED EMBODIMENTS

Figure 1:
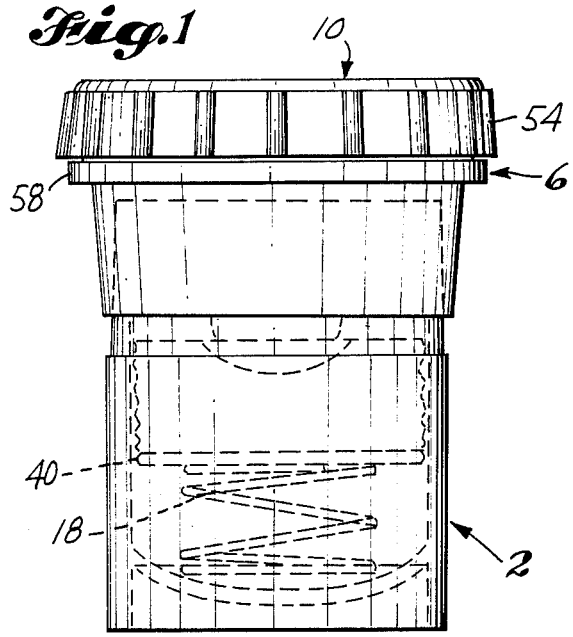
FIG. 1 is an elevational view of one presently preferred embodiment of the invention.
Figure 2:
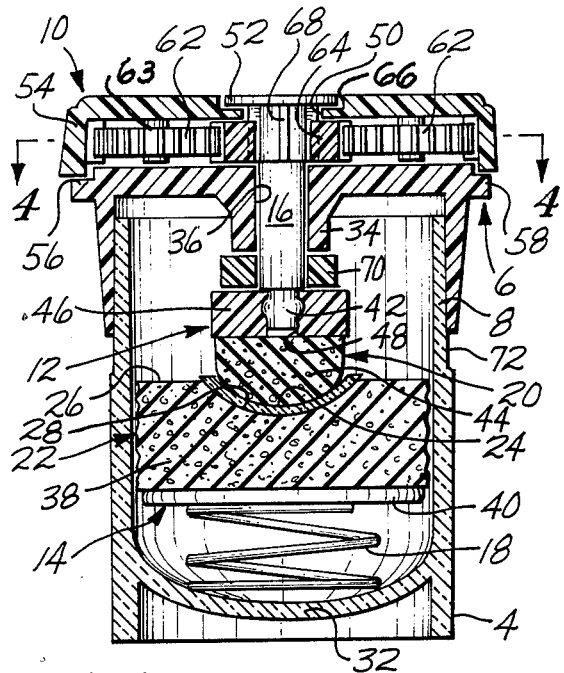
FIG. 2 is a part cross-sectional view of the device on the vertical axis thereof.
Figure 3:
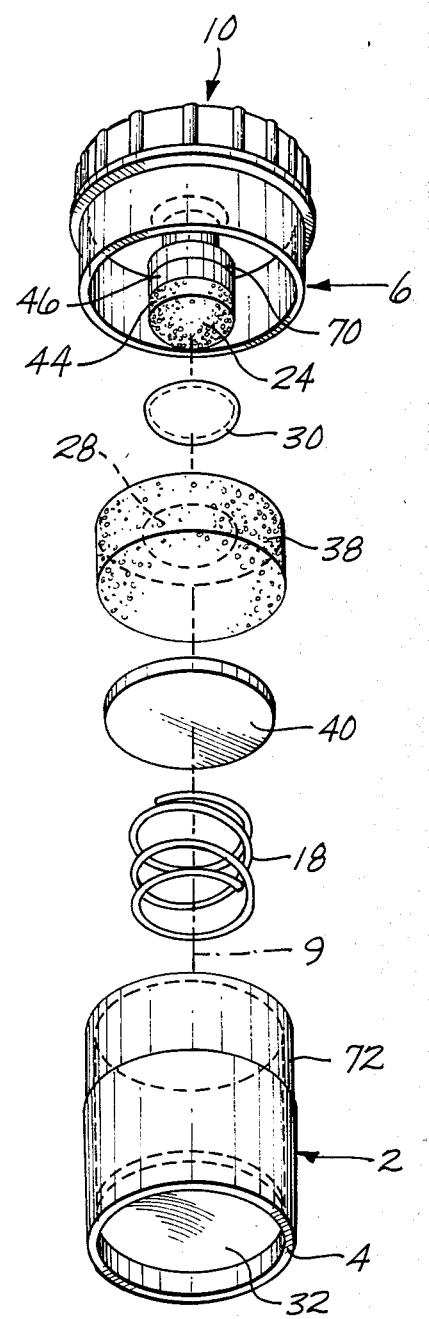
FIG. 3 is a part exploded perspective view of the device.

Referring first to FIGS. 1-4, it will be seen that the device comprises a cup shaped cylindrical housing 2 which is adapted to stand upright on the closed end 4 thereof and has an inverted cup shaped, flanged cylindrical cap 6 on the open end 8 thereof. The outside of the latter end of the housing is slightly rabbeted at a taper and the cap 6 is adapted to telescopically engage on the same, the fit, however, being a force fit adapted to interconnect the members so that they resist rotation in relation to one another about the vertical axis 9 of the assembly. The cap 6 is also equipped with a rotor 10 for driving certain additional components within the assembly, as shall be explained. These comprise a pair of mating scrubber elements 12 and 14 which are mounted in the cap and housing, respectively, and include, in turn, a shaft 16 which is part of the upper element 12 and rotatable under the drive of the rotor 10. They also include a coiled spring 18 which is part of the lower element 14 and which is mounted in the housing to assert a yieldable bias on the relatively forward ends of the elements when they are engaged in the manner shown. The ends themselves take the form of scrubber heads 20 and 22 which are pestle and mortar-like, respectively, and have opposing surfaces 24 and 26 thereon which are guided into engagement with one another when the cap 6 is connected with the housing 2. The surface 24 of the pestle-like head 20 is convex, and the surface 26 of the mortar-like head 22 has a concave recess 28 therein which is adapted to mate with the surface 24 of the pestle-like head and vice versa. When the device is put to use, a contact lens 30 is lightly clamped between the surfaces when the scrubber elements engage one another, and the rotor 10 is employed to scrub one side of the lens while it is trapped between the surfaces on the axis 9 of the assembly, as shall be explained.

More specifically, the housing 2 has a raised bottom 32 which is interiorly dished to form a cradle for the spring 18, and the lower mortar-like scrubber head 22 is telescopically seated on the spring within the housing. The cap 6 has a central hub 34 which is apertured at the axis 9 of the assembly, and the shaft 16 of the upper scrubber element 12 is rotatably journaled in the aperture 36 and interconnected with the rotor 10 at the upper end thereof. The lower scrubber head 22 comprises a sponge pad 38 of suitably stiff, non-shredding silicon or polyurethane foam or the like which has a rigid plate backing 40 therebelow and, as indicated, a concave recess or dimple 28 in the upper face thereof at the axis. The shaft 16 is fluted and flanged at the top and has a reduced but bulbous neck 42 at its bottom. The upper scrubber head 20 comprises an inverted dome shaped sponge nipple 44 of more suitably stiff, non-shredding silicon or polyurethane foam or the like, which has a rigid plate backing 46 secured to the top thereof. The backing 46 is apertured at its center and the aperture 48 is adapted to snap engage on the neck 42 of the shaft so that the nipple 44 can be removed and replaced from time to time. As indicated, the convex surface 24 of the nipple is adapted to mate with the concave surface 28 of the dimple when the device is assembled and put to use, as shall be explained.

The rotor 10 is also cap-like in nature and has an aperture 50 at the center thereof which is top rabbeted to receive the flange 52 of the shaft 16. The skirt 54 of the rotor is sized to telescopically engage with a rabbet 56 at the outer periphery of the flange 58 of the cap; and at its outside, the skirt is fluted for ease in gripping it. At its inside, the skirt has an internal gear ring 60 (FIG. 4) which is engaged with a pair of diametrically opposed planetary gears 62 that are suspended from the roof of the rotor on studs 63. The planetary gears 62 interengage in turn with an internally slotted sun gear 64 that is keyed to the upper end portion of the shaft below the rabbet 66 of the rotor.

To assemble the device, the shaft 16 is suspended on the rotor in the rabbet 66 thereof and the sun gear 64 is engaged with the flutes or ribs 68 of the shaft at the upper end thereof, to key the two together and complete the gear train. The shank of the shaft is then dropped through the aperture 36 in the hub of the cap, and a washer 70 is added to the shaft below the hub, before the plate 46 of the nipple 44 is snap engaged on the neck 42 of the shaft. The cap 6 is then engaged on the top 8 of the housing until the two firmly interconnect with one another. The taper in the rabbet 72 of the housing assures that the user can sense this condition, and in effect provides a limit stop at which the nipple 44 mates with the dimple 28 in the pad of the lower scrubber element, and depresses the pad slightly against the bias of the spring. As a result, when a contact lens 30 is inserted between the nipple and the pad, it is lightly clamped between the two sponges and effectively trapped against lateral displacement from the axis 9. Accordingly, when the rotor is rotated, to rotate the shaft and thus the nipple through the mechanism of the gear train, the pad preferentially fixes or "grabs" the lens and assures that the nipple is rotated in relation to the upper side of the lens, thus removing unwanted debris from the same in a manner similar to that previously done by hand.

Normally, a cleaning solution is added to the upper side of the lens before the nipple is engaged with it to augment the cleaning effect, as well as to diminish the coefficient of friction between the two and facilitate the cleaning operation. Additionally, the pad may be given a different coefficient of friction from that of the nipple to aid in the differentiation between heads. For example, the pad may be constructed from a sponge material or some other material which is adapted to "cling" to the lens in a way unlike that of the nipple, thus differentiating better between the tendency of one head to rotate free of the lens, and the other to cling to it.

When the upper side of the lens has been cleaned, the cap is removed, and assuming that the lens is reversible, such as in the case of a soft lens, it can be inverted and returned to the dimple to clean the other side of the same, that is, the side which mated with the surface of the dimple in the first step.

Referring now to FIGS. 5–7, it will be seen that the device is equipped to clean a pair of lens simultaneously, and moreover, to enable both sides of the respective lens to be cleaned whether the lens are invertible or not. The oblong housing 74 of the device is again equipped with a sponge pad 76 which is telescopically seated in the same and rigidly backed to rest on a pair of coiled springs 77 symmetrically positioned in a pair of raised parapets 78 on the bottom of the housing. The upper surface 80 of the pad has a dimple 82 therein, above one of the springs 77, and a raised dome 83 at the other side thereof, above the other spring 77. The pestle-like heads 84 and 86 of the hollow, two-part cap 87 are suspended on the shafts 88 of a pair of externally driven spur gears 90 housed in the hollow 92 of the cap. One head, 84, has a convexly rounded sponge nipple 94 similar to that in FIGS. 1–4. The other head, 86, has a dished sponge nipple 96 which mates with the dome 83 on the surface 80 of the pad. A third spur gear 98 is interposed between the pair of driven gears 90 in the hollow 92 of the cap, and a winged turn key rotor 100 is secured to the reduced neck 102 of the arbor 104 upstanding thereon, to drive the two shafts simultaneously through the medium of the gear train 90, 98.

In use, a pair of lens 30 is mounted on the pad 76, and the cap 87 is secured to the housing 74 and used to clean the upper sides of the lens. Then the cap is removed and the lens are interchanged with one another, after being inverted from their original positions so that when the cap is returned, the device can be used to clean what had been the lower sides of the lens in the earlier step.

The pad 76 may be sectionalized, right to left, so that the respective pairs of sponges 82, 84 and 83, 86 have differing coefficients of friction at the respective surfaces thereof, from one pair to the other, at least with respect to one of the sponges in each of the respective pairs. Alternatively, the coefficient of friction may be varied mechanically, say by providing a hole or holes in the dimple 82 to alter the coefficient thereof.

A cross linked, closed cell, thermomoldable foam EVA material having a nominal density of 2–4 and a comparison resistance of 7, may be used for the right hand side of the pad, if not for the whole of it, to prevent a hard lens from being indented into the pad at its edges, and thus making less than whole contact with the dome 83.

Referring now to FIG. 8 it will be seen that the third embodiment comprises a pair of pivotally interconnected tongs 106 having a coiled spring 108 interposed on a pair of pin mounts 109 between the upper arms 110 thereof. The arms 110 are equipped with a pestle and mortar assembly similar to that employed in the other embodiments. The arms have crooks 112 thereon and the elongated tips 114 of the crooks are substantially coaxial with one another. The tip of the right hand crook has an axial hole 116 therethrough, and a scrubber element 118 is journaled in the hole in the manner of the elements in FIGS. 1–7. The head 120 of the element has a dimple 122 in the sponge thereof, like that on the left hand side of the device in FIGS. 5–7, and the head 124 of the opposing element has a convex surface on the sponge thereof to mate with the dimpled element 118. A turn key type rotor 126 is secured to the relatively outside end of the dimpled element 118 to rotate the head 120 thereof while a lens 30 is lightly clamped between the heads, using the handles 128 of the device to generate the clamping force against the bias of the springs 108.

In use, and as before, the lens tends to be grabbed by one sponge while the other is rotated relative to it; and once again, differing sponge materials may be employed to augment the effect, the choice and location being a matter of which sponge is to be rotated relative to the lens and which is to grab it. In addition, the pin mounts 109 may be elongated to form stops for limiting the travel of the tongs to a closed position at which the lens is lightly clamped between the sponges and the sponge 120 can be rotated relative to the lens. Or the spring 108 may limit the travel of the tongs to a closed position at which the user can sense that the lens is lightly clamped between the surfaces of the sponges, for example, by his ability to rotate the sponge 120, the latter ability being a function, of course, of the bias he himself generates with his hand.

What is claimed is:

1. A device for cleaning contact lens comprising a pair of manually operated clamping means which open and close in relation to one another substantially along an axis extending therebetween, said clamping means having a pair of relatively rotatable scrubber elements thereon that are cooperatively engagable with one another at the relatively forward ends thereof when the clamping means are closed, yieldable biasing means operatively interposed between the clamping means so that when the clamping means are closed, the ends of the scrubber elements engage one another against the bias thereof, said scrubber elements having complementary convex and concave surfaces on the respective ends thereof, and said surfaces being adapted to mate with the opposing sides of a contact lens and clamp the lens lightly therebetween when the scrubber elements engage one another, means interconnecting the clamping means in the closed position thereof so that they resist relative rotation about the axis, means fixing the end of one scrubber element to the corresponding clamping means so that said end of the one element cannot rotate about the axis when the lens is clamped between the surfaces of the ends, means including a shaft rotatably mounted in the other clamping means at an axially fixed location thereon to position the end of the other scrubber element in rotatable engagement with the lens when the lens is clamped between the surfaces of the ends, means connected with the shaft whereby the end of the other scrubber element can be rotated against the lens from a point relatively outside of the clamping means, and frictional differentiation means on the end of the one scrubber element whereby the surface thereof clings to the lens and prevents the lens from rotating while the end of the other scrubber element is rotated in relation to the lens.

2. The device according to claim 1 wherein the shaft has a scrubber head at the relatively forward end thereof constituting the aforesaid other scrubber element.

3. The device according to claim 2 wherein the shaft has a rotor connected therewith for rotating the scrubber head at the relatively forward end thereof.

4. The device according to claim 3 wherein the rotor is connected with the relatively rearward end of the shaft on the opposite side of the body of the other clamping means from the relatively forward end of the shaft.

5. The device according to claim 4 wherein the connection between the rotor and the shaft includes a gear train for changing the rotary speed of the shaft in relation to that imparted to the rotor.

6. The device according to claim 1 wherein the one scrubber element comprises a coiled spring which is mounted on the corresponding clamping means and has a scrubber head at the relatively forward end thereof.

7. The device according to claim 1 wherein the clamping means corresponding to the one scrubber element has a recess therein, the corresponding scrubber element is cradled in the recess, and includes a coiled spring which is interposed between the relatively forward end of the respective scrubber element and the bottom of the recess.

8. The device according to claim 1 wherein the connection between the clamping means includes a limit stop for the closed position thereof, and closing the clamping means to the stop operates to clamp the lens lightly between the surfaces of the elements under a predetermined bias therebetween.

9. The device according to claim 1 wherein the ends of the scrubber elements are pestle and mortar-like, respectively, and have opposing surfaces thereon which are guided into engagement with one another when the clamping means are closed.

10. The device according to claim 9 wherein the surface of the pestle-like end is convex, and the surface of the mortar-like end has a concave recess therein which is adapted to mate with the surface of the pestle-like end and vice versa.

11. The device according to claim 9 wherein the surface of the mortar-like end has a convex dome thereon, and the surface of the pestle-like end has a concave recess therein which is adapted to mate with the dome of the mortar-like end and vice versa.

12. The device according to claim 1 wherein the aforesaid other scrubber element has a rigidly backed, convexly shaped, pestle-like sponge nipple at the forward end thereof, and the one scrubber element has a rigidly backed, concavely recessed, mortar-like sponge pad at the forward end thereof.

13. The device according to claim 12 wherein the sponges have differing coefficients of friction at the respective convex and concave surfaces thereof.

14. The device according to claim 12 wherein the sponges are mounted in the recesses of a pair of cups which telescopically interconnect with one another at the open ends thereof.

15. The device according to claim 14 wherein the sponge pad has a coiled spring assembled therewith and the assembly is mounted in the recess of the corresponding cup.

16. The device according to claim 15 wherein the sponge nipple is rotatably mounted in the recess of the other cup, and there is a hand operated rotor connected with the nipple outside of the latter cup to rotate the sponges in relation to one another when the cups are interconnected at the open ends thereof.

17. The device according to claim 1 wherein there are pairs of scrubber elements on the clamping means, the relatively forward ends of which are cooperatively engageable with one another when the clamping means are closed, and have complementary convex and concave surfaces thereon that are reversedly disposed to one another, from one pair to the other, so that the respective pairs of surfaces will mate with a pair of lens that are reversedly disposed to one another.

18. The device according to claim 17 wherein one scrubber element in each pair has a rigidly backed, convexly shaped, pestle-like sponge at the relatively forward end thereof, and the other scrubber element in each pair has a rigidly backed, concavely recessed, mortar-like sponge at the relatively forward end thereof, and wherein the respective pairs of sponges have differing coefficients of friction at the respective convex and concave surfaces thereof.

19. The device according to claim 18 wherein the pairs of sponges have differing coefficients of friction at the respective surfaces thereof, from one pair to the other, at least with respect to one of the sponges in each of the respective pairs.

20. A device for cleaning contact lenses comprising a pair of manually operated clamping means which open and close in relation to one another substantially along an axis extending therebetween, said clamping means having a pair of relatively rotatable scrubber elements thereon that are cooperatively engageable with one another at the relatively forward ends thereof when the clamping means are closed, yieldable biasing means operatively interposed between the clamping means so that when the clamping means are closed, the ends of the scrubber elements are engaged with one another against the bias thereof, said scrubber elements having complementary convex and concave surfaces on the respective ends thereof, said surfaces being adapted to mate with the opposing sides of a contact lens and clamp the lens lightly therebetween when the scrubber elements engage one another, and said yieldable biasing means limiting the travel of the clamping means to a closed position at which the user can sense that the lens is lightly clamped between the surfaces of the elements under a predetermined bias therebetween, means interconnecting the clamping means in the closed position thereof so that they resist relative rotation about the axis, means fixing the end of one scrubber element to the corresponding clamping means so that said end of the one element cannot rotate about the axis when the lens is clamped between the surfaces of the ends, means including a shaft rotatably mounted in the other clamping means at an axially fixed location thereon to position the end of the other scrubber element in rotatable engagement with the lens when the lens is clamped between the surfaces of the ends, means connected with the shaft whereby the end of the other scrubber element can be rotated against the lens from a point relatively outside of the clamping means, and frictional differentiation means on the end of the one scrubber element whereby the surface thereof clings to the lens and prevents the lens from rotating while the end of the other scrubber element is rotated in relation to the lens.

21. A device for cleaning contact lens comprising a pair of manually operated tongs which are pivotally interconnected with one another so that corresponding end portions thereof open and close in relation to one another substantially along an axis extending therebetween, said end portions having a pair of relatively rotatable scrubber elements thereon that are cooperatively engageable with one another at the relatively forward ends thereof when the end portions of the tongs are closed, one scrubber element having a rigidly backed concavely recessed, mortar-like sponge pad at the forward end thereof, and the other scrubber element having a rigidly backed, convexly shaped, pestle-like sponge nipple at the forward end thereof, yieldable biasing means operatively interposed between the aforesaid end portions of the tongs so that when the end portions are closed, the nipple and pad are engaged with one another against the bias thereof, said nipple and pad being adapted to mate with the opposing sides of a contact lens and clamp the lens lightly between the respective convex and condave surfaces thereof when the nipple and pad engage one another, means interconnecting the end portions of the tongs in the closed position thereof so that they resist relative rotation about the axis, means fixing the sponge pad to the corresponding end portion of the tongs so that the pad cannot rotate about the axis when the lens is clamped between the surfaces of the nipple and pad, means including a shaft rotatably mounted in the other end portion of the tongs at an axially fixed location thereon to position the sponge nipple in rotatable engagement with the lens when the lens is clamped between the surfaces of the nipple and pad, means connected with the shaft whereby the sponge nipple can be rotated against the lens from a point relatively outside of the end portions of the tongs, and frictional differentiation means on the sponge pad whereby the surface thereof clings to the lens and prevents the lens from rotating while the sponge nipple is rotated in relation to the lens.

22. The device according to claim 21 wherein the yieldable biasing means comprise a coiled spring which is interposed between the aforesaid end portions of the tongs to limit the travel of the same to a closed position at which the user can sense that the lens is lightly clamped between the surfaces of the sponges under a predetermined bias therebetween.

* * * * *